(12) United States Patent
Shamaie et al.

(10) Patent No.: US 9,261,979 B2
(45) Date of Patent: Feb. 16, 2016

(54) GESTURE-BASED MOBILE INTERACTION

(75) Inventors: Atid Shamaie, Ottawa (CA); Francis B. MacDougall, Ottawa (CA)

(73) Assignee: QUALCOMM Incorporated, San Diego, CA (US)

( * ) Notice: Subject to any disclaimer, the term of this patent is extended or adjusted under 35 U.S.C. 154(b) by 644 days.

(21) Appl. No.: 12/194,772

(22) Filed: Aug. 20, 2008

(65) Prior Publication Data

US 2009/0051648 A1 Feb. 26, 2009

Related U.S. Application Data

(60) Provisional application No. 60/956,776, filed on Aug. 20, 2007.

(51) Int. Cl.
*G06F 3/0346* (2013.01)
*G06F 3/01* (2006.01)

(52) U.S. Cl.
CPC ............. *G06F 3/0346* (2013.01); *G06F 3/017* (2013.01)

(58) Field of Classification Search
CPC ... G06F 3/017; G06F 3/0346; G06F 3/04883; G06F 2203/04806; G06F 1/1694
USPC ........................... 345/156–158; 715/863, 765
See application file for complete search history.

(56) References Cited

U.S. PATENT DOCUMENTS

| | | |
|---|---|---|
| 5,319,721 A | 6/1994 | Chefalas et al. |
| 5,381,489 A | 1/1995 | Bernzott et al. |
| 5,454,043 A | 9/1995 | Freeman |
| 5,682,439 A | 10/1997 | Beernink et al. |
| 6,226,403 B1 | 5/2001 | Parthasarathy |
| 6,272,242 B1 | 8/2001 | Saitoh et al. |
| 6,285,786 B1 | 9/2001 | Seni et al. |
| 6,304,674 B1 * | 10/2001 | Cass et al. ..................... 382/224 |
| 6,339,655 B1 | 1/2002 | Aharonson et al. |
| 6,535,619 B1 | 3/2003 | Suwa et al. |
| 6,636,631 B2 | 10/2003 | Miyazaki et al. |
| 6,735,566 B1 | 5/2004 | Brand |
| 6,754,386 B1 | 6/2004 | Williamson et al. |
| 6,819,782 B1 | 11/2004 | Imagawa et al. |
| 6,944,317 B2 | 9/2005 | Pavlovic et al. |
| 7,171,046 B2 | 1/2007 | Myers et al. |
| 7,308,112 B2 | 12/2007 | Fujimura et al. |
| 2002/0118880 A1 | 8/2002 | Liu et al. |

(Continued)

FOREIGN PATENT DOCUMENTS

| | | |
|---|---|---|
| CN | 1615508 A | 5/2005 |
| JP | H0684008 A | 3/1994 |

(Continued)

OTHER PUBLICATIONS

International Search Report and Written Opinion—PCT/US2008/073671, International Search Authority—European Patent Office—Nov. 28, 2008.

(Continued)

*Primary Examiner* — Amr Awad
*Assistant Examiner* — Stephen Bray
(74) *Attorney, Agent, or Firm* — Kilpatrick Townsend & Stockton LLP

(57) ABSTRACT

Motion of a device is sensed using image data, and a gesture corresponding to the sensed motion of the device is recognized. Functionality of the device corresponding to the recognized gesture is determined and invoked.

22 Claims, 12 Drawing Sheets

(56) References Cited

U.S. PATENT DOCUMENTS

| | | |
|---|---|---|
| 2003/0113018 A1 | 6/2003 | Nefian et al. |
| 2003/0156756 A1 | 8/2003 | Gokturk et al. |
| 2003/0159567 A1* | 8/2003 | Subotnick .................... 84/626 |
| 2003/0208289 A1 | 11/2003 | Ben-Arie |
| 2004/0056907 A1 | 3/2004 | Sharma et al. |
| 2004/0143434 A1 | 7/2004 | Divakaran et al. |
| 2004/0193413 A1 | 9/2004 | Wilson et al. |
| 2004/0223647 A1 | 11/2004 | Blount et al. |
| 2005/0043948 A1 | 2/2005 | Kashihara et al. |
| 2005/0100214 A1 | 5/2005 | Zhang et al. |
| 2005/0216867 A1* | 9/2005 | Marvit et al. ............. 715/863 |
| 2005/0225638 A1* | 10/2005 | Tanaka et al. ............ 348/159 |
| 2005/0229117 A1* | 10/2005 | Hullender et al. ......... 715/863 |
| 2005/0238201 A1 | 10/2005 | Shamaie |
| 2005/0257174 A1* | 11/2005 | Wilson ...................... 715/863 |
| 2006/0013440 A1* | 1/2006 | Cohen et al. ............... 382/103 |
| 2006/0018546 A1 | 1/2006 | Lagardere et al. |
| 2006/0267966 A1* | 11/2006 | Grossman et al. ......... 345/179 |
| 2007/0005537 A1 | 1/2007 | Abdulkader et al. |
| 2007/0130547 A1 | 6/2007 | Boillot |
| 2007/0189613 A1 | 8/2007 | Tanaka |
| 2007/0268246 A1* | 11/2007 | Hyatt ......................... 345/156 |
| 2008/0310738 A1 | 12/2008 | Katoh et al. |
| 2009/0052785 A1 | 2/2009 | Shamaie |

FOREIGN PATENT DOCUMENTS

| | | | |
|---|---|---|---|
| JP | H0728591 | A | 1/1995 |
| JP | 2002183662 | A | 6/2002 |
| JP | 2003527708 | A | 9/2003 |
| JP | 2007087089 | A | 4/2007 |

OTHER PUBLICATIONS

Shamaie et al., "A Dynamic Model for Real-Time Tracking of Hands in Bimanual Movements", In Proceedings of Gesture Workshop, 2003, pp. 172-179.

Shamaie et al., "Accurate Recognition of Large Number of Hand Gestures", 2nd Iranian Conference on Machine Vision and Image Processing, pp. 1-10, Feb. 2003.

Shamaie et al., "Bayesian Fusion of Hidden Markov Models for Understanding Bimanual", Automatic Face and Gesture Recognition, 2004. Proceedings. Sixth IEEE International Conference on, May 2004, pp. 602-607.

Shamaie et al., "Graph-based matching of occluded hand gestures", IEEE Applied Imaginary Pattern Recognition Workshop, Oct. 2001, pp. 67-73.

Yamato et al., "Recognizing Human Action in Time-Sequential Images using Hidden Markov Model", Proceedings 1992 IEEE Computer Society Conference on Computer Vision and Pattern Recognition, 1992, pp. 379-385.

Yohei, S., et al., "Hand gesture recognition as multi-modal interface for PC," Technical Report of IEICE, PRMU 104 (291), Sep. 4, 2004, vol. 104, No. 291, pp. 1-8.

* cited by examiner

| Gesture | Functionality |
|---|---|
| Handshake | Record Sound Snippet |
| Choking | Call 911 |
| Nervous Jitter | Play Game |
| Phone to Ear | Begin Timer |

GESTURE-BASED MOBILE INTERACTION

CROSS-REFERENCE TO RELATED APPLICATION

This application claims the benefit of U.S. Provisional Patent Application No. 60/956,776, filed Aug. 20, 2007, which is incorporated herein by reference.

FIELD

The present disclosure generally relates to mobile devices, and at least one particular implementation relates to interacting with mobile devices using a set of defined gestures.

BACKGROUND

Mobile devices, such as cell phones or PDAs, have several functions each of which may be activated through pressing a unique sequence of keys or through provided menus. As mobile devices get more and more features, accessing all of the features may become more complex given a limited number of buttons on the devices.

SUMMARY

According to one general implementation, and instead of selecting a control on a mobile device, a user may move the mobile device through a series of motions that define a gesture, in order to invoke certain functionality on the mobile device that is associated with that gesture. In doing so, functions may be implemented without requiring the use of physical buttons or user interface controls, allowing mobile devices to be made smaller and effecting increased accuracy in functionality selection.

According to another general implementation, a computer-implemented process includes sensing motion of a device using image data, and recognizing a gesture corresponding to the sensed motion of the device. The process also includes determining functionality of the device corresponding to the recognized gesture, and invoking the functionality.

Implementations may include one or more of the following features. For example, the motion may include a first motion in a first trajectory, and a second motion in a second, different trajectory. Recognizing the gesture may further include recognizing a character shape, geometric shape or pattern defined by the sensed motion of the device. Sensing the motion of the device may further include detecting a subconscious body movement of a user of the device, and the invoked functionality may be associated with the subconscious body movement. The process may also include detecting first and second user inputs at first and second times, respectively, where sensing the motion of the device further comprise sensing motion of the device occurring between the first and second times.

In further examples, the first input may be a shaking user input, a control selection user input, or a held-static user input. Recognizing the gesture may further include selecting the gesture based on comparing the sensed motion to a modeled vocabulary of gestures. The process may also include normalizing the sensed motion of the device, comparing the normalized, sensed motion to the modeled vocabulary of gestures, and determining a parameter based on comparing the sensed motion to the normalized motion. The functionality may be determined based on the parameter. The parameter may be input to the invoked functionality.

In additional examples, the vocabulary of gestures may be modeled using any number of Hidden Markov Models (HMM) or rule-based models. The process may further include selectively activating fewer than all available gestures in the vocabulary of gestures, where the gesture may be selected based on comparing the sensed motion to the activated gestures. The fewer than all of the available gestures may be enabled based on a manufacturer setting, a user setting or an application setting. The process may also include training the device to recognize a particular gesture, and adding the particular gesture to the vocabulary of gestures. Invoking the functionality may further include executing an application, manipulating an image, or inputting a character.

In other examples, sensing motion of the device may include detecting first and second user inputs at first and second times, respectively, the first time occurring before the second time, sensing a first motion in a first trajectory before the first time, sensing a second motion in a second, different trajectory after the second time, joining the first and second motions, and outputting the joined first and second motions as the sensed motion. Invoking the functionality may further include navigating in a virtual environment, manipulating an image, entering a character, executing an application, or invoking media hub functionality.

According to another general implementation, a device includes a sensor and a processor. The sensor is configured to sense motion. The processor is configured to recognize a gesture corresponding to the sensed motion sensed by the sensor, to determine functionality corresponding to the recognized gesture, and to invoke the functionality. In example implementations, the sensor may be a camera, and the motion may be sensed using optical flow.

According to another general implementation, a computer-readable medium is encoded with a computer program. The computer program includes instructions that, when executed, operate to cause a computer to perform operations including sensing motion of a device using image data, recognizing a gesture corresponding to the sensed motion of the device, determining functionality of the device corresponding to the recognized gesture, and invoking the functionality.

Implementations of any of the techniques described above may include a method, a process, a system, a device, an apparatus, an interaction interface, instructions stored on a computer-readable medium, or a computer-readable medium encoded with a computer program. The details of one or more implementations are set forth in the accompanying drawings and the description below. Other features will be apparent from the description and drawings, and from the claims.

BRIEF DESCRIPTION OF THE DRAWINGS

Like reference numbers represent corresponding parts throughout.

DETAILED DESCRIPTION

According to one general implementation, and instead of selecting a control on a mobile device, a user may move the mobile device through a series of motions that define a gesture, in order to invoke certain functionality on the mobile device that is associated with that gesture. In doing so, functions may be implemented without requiring the use of physical buttons or user interface controls, allowing mobile devices to be made smaller and effecting increased accuracy in functionality selection.

Thus, a user interacts with a device, such as a mobile device, by performing a set of defined gestures. Because mobile devices may be small and held in a hand of a person, the user may perform a gesture while holding a mobile device. An enhanced approach is provided, in which a device may sense motion, recognize a gesture corresponding to the sensed motion, determine functionality of the device corresponding to the recognized gesture, and invoke the functionality.

As used herein throughout, a "gesture" is intended to refer to a form of non-verbal communication made with part of a human body, and is contrasted with verbal communication such as speech. For instance, a gesture may be defined by a movement, change or transformation between a first position, pose, or expression and a second pose, position or expression. Common gestures used in everyday discourse include for instance, an "air quote" gesture, a bowing gesture, a curtsey, a cheek-kiss, a finger or hand motion, a genuflection, a head bobble or movement, a high-five, a nod, a sad face, a raised fist, a salute, a thumbs-up motion, a pinching gesture, a hand or body twisting gesture, or a finger pointing gesture. A gesture may be detected using a camera, such as by analyzing an image of a user, using a tilt sensor, such as by detecting an angle that a user is holding or tilting a device, sensing motion of a device, or by any other approach. Gestures may be formed by performing a series of motions in a particular pattern or fashion.

A user may make a gesture (or "gesticulate") by changing a position of a body part (i.e. a waving motion), or a user may gesticulate without changing a position of a body part (i.e. by making a clenched fist gesture, or by holding a body part immobile for a period of time). Although the enhanced approach uses, as examples, hand and arm gestures, other types of gestures may also be used.

Figure 1:
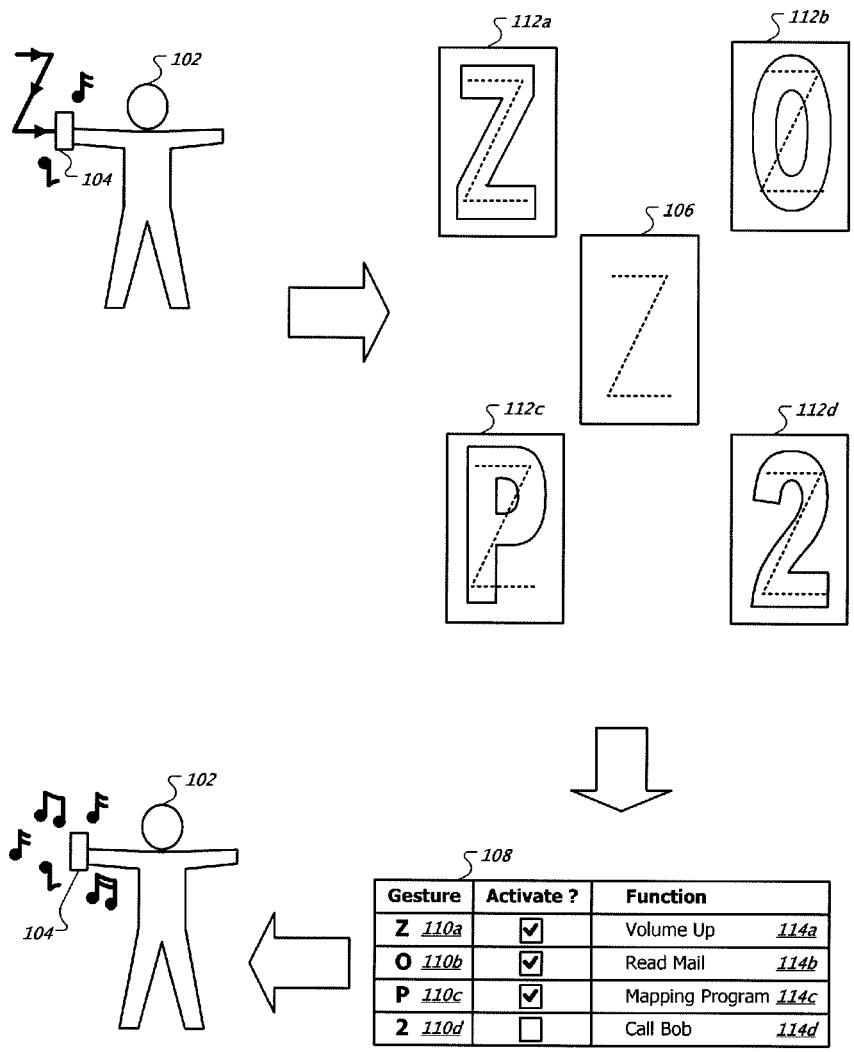
FIG. 1 is a contextual diagram demonstrating invocation of device functionality in response to gesture recognition.

FIG. 1 is a contextual diagram demonstrating invocation of device functionality in response to gesture recognition. A user 102 creates a Z-shaped gesture in the air with a device 104 (i.e., the user 102 moves the device 104 in a rightward (from the reader's perspective) direction, then in a downward-and-leftward direction, and then in a second rightward direction generally parallel to the first rightward direction). Music or other audio is playing on the device 104. The device 104, which may be a mobile phone, audio player, or other device, may sense the motion of the user 102 (e.g., using a sensor), recognize a gesture corresponding to the sensed motion, determine functionality corresponding to the recognized gesture, and invoke the determined functionality.

For example, the device 104 may represent the movements of the user 102 as an input gesture pattern 106 shown here as a series of dots. The input gesture pattern 106 may be compared to gesture definitions included in a vocabulary stored on the device 104. For example, a table 108 illustrates a vocabulary that includes gesture definitions for gestures 110a-d, representing the characters "Z", "O", "P", and "2", respectively. Fewer or more gesture definitions may also be defined.

A vocabulary may include boundaries, such as boundaries 112a-d, which are included in or otherwise associated with gesture definitions. For example, the "Z" character gesture 110a may be associated with the boundary 112a, the "O" character gesture 110b may be associated with the boundary 112b, the "P" character gesture 110c may be associated with the boundary 112c, and the "2" character gesture 110d may be associated with the boundary 112d. Boundaries (or templates) may define a normalized or standardized version of gesture, such that motions performed by the user are compared against the boundaries to determine whether a particular gesture is performed.

Although the boundaries are illustrated as visual boundaries, each gesture may be represented as a set of acceptable vectors, motions, or accelerations that define the gesture. Moreover, the gesture definitions may require that certain motions occur in certain directions, or require that motions that make up a gesture occur in a particular sequence.

An inputted gesture pattern performed by the user may be compared to each of a vocabulary's gesture definitions, to determine if the inputted gesture pattern may be included within the boundary of one or more vocabulary gestures. For example, the input gesture pattern 106 (i.e., the "Z"-shaped pattern) may be compared to each of the boundaries 112a-d. The input gesture pattern 106 does not fit inside the "O" shape of the boundary 112b or inside the "P" shape of the boundary 112c. However, the input gesture pattern 106 may fit inside the "Z" shape of the boundary 112a and inside the "2" shape of the boundary 112d. The gestures 110a and 110d, therefore, are identified as candidate gestures.

Since a performed gesture may be expected to fall into more than one boundary or definition, certain gestures in the vocabulary may be disabled (or deactivated) by a user or an application, to reduce computational expense in resolving conflicts and to increase accuracy. Thus, a vocabulary gesture may be either active or inactive. For example the table 108 shows that the "Z" character gesture 110a, the "O" character gesture 110b, and the "P" character gesture 110c are active, while the "2" character gesture 110d is inactive.

Gestures may be activated or deactivated on a per-device or per-application basis, and may be activated and deactivated by an end user, by a manufacturer and/or by an application developer. For efficiency of gesture recognition, one gesture in a set of similar gestures may be active while the other gestures in the set are inactive. For example, the "2" and "Z" characters are similar in shape, so only one of the associated gestures are active. Since only one of the candidate gestures 110a and 110d is active in this example, the "Z" character gesture 110a is recognized in response to the movement of the user 102.

Device functions may be mapped to gestures, such that if a gesture is recognized, mapped functionality is invoked in response to the performance of the gesture. For example, the table 108 indicates that a "volume up" function 114a is mapped to the "Z" character gesture 110a, a "read mail" function 114b is mapped to the "O" character gesture 110b, a "mapping program" function 114c is mapped to the "P" character gesture 110c, and a "call specific person" function 114d (e.g., call "Bob") is mapped to the "2" character gesture 110d. In response to the recognition of the active "Z" character gesture, the "volume up" function is identified and invoked, resulting in an increase of the volume of the audio playing on the device 104.

As mentioned above, gestures may be recognized if an inputted gesture pattern lies inside of a boundary defined by a vocabulary gesture definition. Other approaches may be used to recognize gestures. For example, a vocabulary gesture may be defined as a set of one or more directional descriptions of movements. For example, the "Z" character gesture 110a may be represented (i.e., described) as "move right horizontally", "move downward and leftward", "move right horizontally, parallel to the first movement". If the movements of an inputted gesture match the movements defined by a vocabulary gesture definition, the inputted gesture may be recognized. As another example of gesture recognition, a vocabulary gesture may be defined as occupying a set of points on a grid, and an inputted gesture may be recognized if the movements of the inputted gesture "cross" the same points (or a certain percentage of points).

Figure 2:
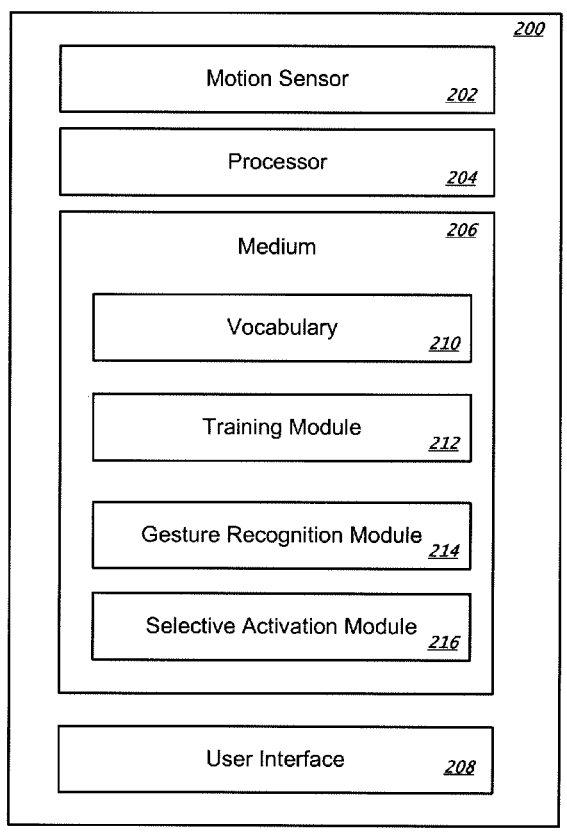
FIG. 2 is a block diagram of a device.

FIG. 2 is a block diagram of a device 200. The device 200 may be a mobile telephone, and/or may be or include a component of a personal computer (PC) or gaming system, a laptop, a handheld or tablet computer, a personal data assistant ("PDA") or another type of embedded system such as a computer keyboard or a remote control. The device 200 also may be an iPod device or other portable music player, a beeper or other communication device, or a handheld or portable electronic device for gaming, communications, and/or data organization. In some implementations, the device 200 is attached to or worn on the user's body. The device 200 includes a motion sensor 202, a processor 204, a medium 206 and a user interface 208.

The motion sensor 202 may detect when the device 200 is moved and may detect the direction and magnitude of movements. The motion sensor 202 may be any type of component or apparatus configured to detect or sense motion or position of the device 200. For example, the motion sensor 202 may be one or more cameras, one or more gyroscopes, one or more GPS (global positioning system) trackers, or a combination of these devices. The motion sensor 202 may be located on the exterior or interior of the device 200 in a variety of positions and orientations.

The processor 204 may accept input from the user interface 208 and may analyze data captured by the motion sensor 202. The processor may execute application programs and operating systems being run on the device 200. The device 200 may include multiple processors (or other control circuitry) and may include memory (or other computer-readable storage media) that stores application programs, operating systems, user input programs, and data used by the application programs, operating systems, and user input programs.

The medium 206 stores and records information or data, and may be an optical storage medium, magnetic storage medium, flash memory, or any other storage medium type. The medium 206 includes a vocabulary 210, a training module 212, a gesture recognition module 214, and a selective activation module 216.

The vocabulary 210 includes information regarding gestures that the device 200 may recognize. For example, the vocabulary 210 may include gesture definitions which describe, for each recognized gesture, a set of trajectories or movements included in a gesture. In other examples, gesture definitions included in the vocabulary 210 may include gesture movement boundaries and/or sets of points which define gesture movement patterns.

The training module 212 allows a user to customize gestures. For example, a user may repeatedly perform a gesture using a training interface to define the boundaries of a gesture. The training interface may also allow the user to manually size or stretch the boundary of a gesture.

The gesture recognition module 214 receives motion data from the motion sensor 202 and compares the received motion data to motion data stored in the vocabulary 210 to determine whether a recognizable gesture has been performed.

The selective activation module 216 is used to selectively activate and deactivate gestures in the vocabulary 210. Gestures may be activated and deactivated on a per-user, per-application and/or per-device basis. For example, for an application which uses significant text entry (e.g., an email editor), a "2" character gesture and a "Z" character gesture may both be activated. For an application that has little or no text entry and a relatively small number of commands, one of the "2" or "Z" character gestures may be activated, but not both, since gesture recognition may be more efficient if similarly shaped gestures are not simultaneously active.

When performing a gesture using a device, a user may, in some situations, be physically prevented from completing a gesture, such as if a wall, desk, another person, or some other physical object blocks the path of the user's movement. The user may stop or pause a partially-completed gesture midway, reposition the device (e.g., by repositioning an arm), and restart movement of the device in order to complete the gesture.

Figure 3:
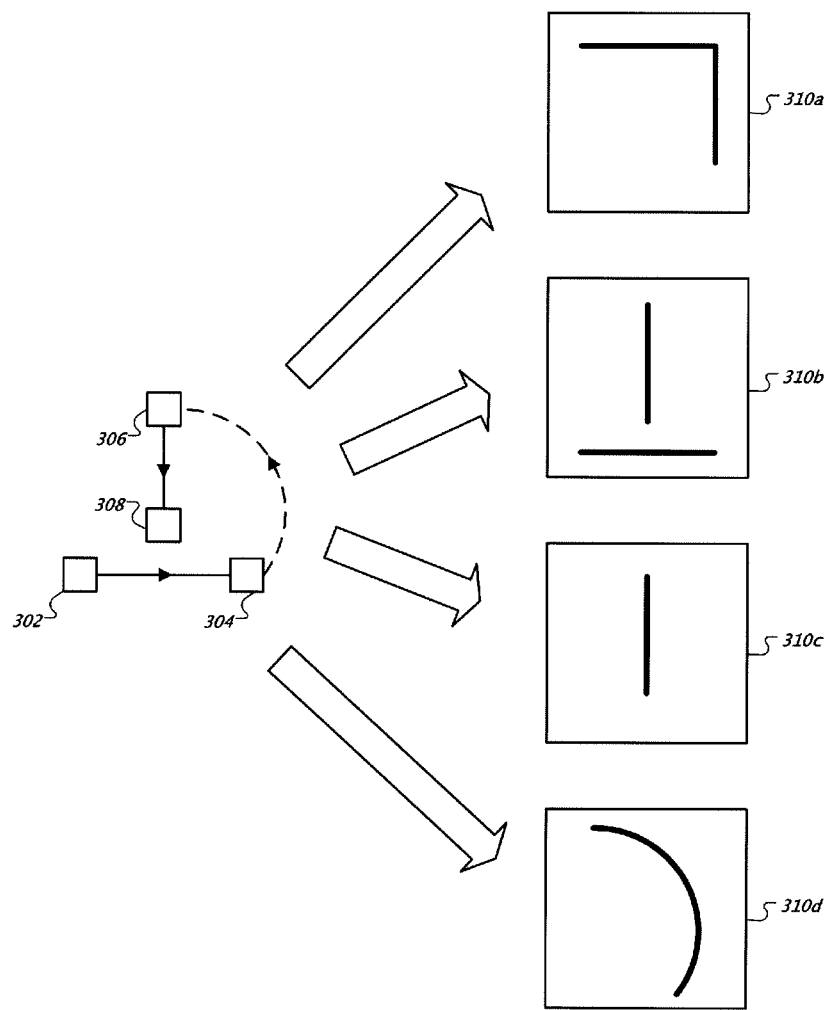
FIG. 3 demonstrates gesture combinations.

A user may indicate that they wish to start a gesture by performing an action, such as pushing a button on the device, shaking the device, or holding the device static for a brief time period (e.g., one second). As shown in FIG. 3, as a first movement of a gesture, the user may move a device rightward from a first position 302 to a second position 304. The user may desire to move downward to continue the gesture but may be physically prevented from doing so. The user may perform an action, such as shaking the device, holding the device static, or pushing a button on the device, to indicate that the current gesture is to be paused. While the device is in a paused state, the user may reposition the device, moving it from the position 304 to a position 306. The user may perform an action, such as shaking the device, holding the device static, or pushing a button on the device, to indicate that the gesture is to be resumed. The user may complete the gesture by moving the device downward from the position 306 to a position 308.

Gesture representations 310a-d illustrate possible gestures that may be recognized from the movements of the device between positions 302 and 308. A gesture representation 310a illustrates the joining of the horizontal and vertical movements into a continuous gesture, as described above. A representation 310b illustrates a recognition of two disconnected gestures. A representation 310c illustrates the recognition of only the second, vertical gesture, such as if only a last gesture was accepted or recognized, and previous gestures (such as the first, horizontal gesture) were erased, filtered-out, or otherwise ignored. A representation 310d illustrates the recognition of the arc movement from the position 304 to the position 306, such as if the gesture start boundary began at the position 304 and the gesture stop boundary ended at the position 306. The user or application may determine which of these representations is the desired representation.

Figure 4:
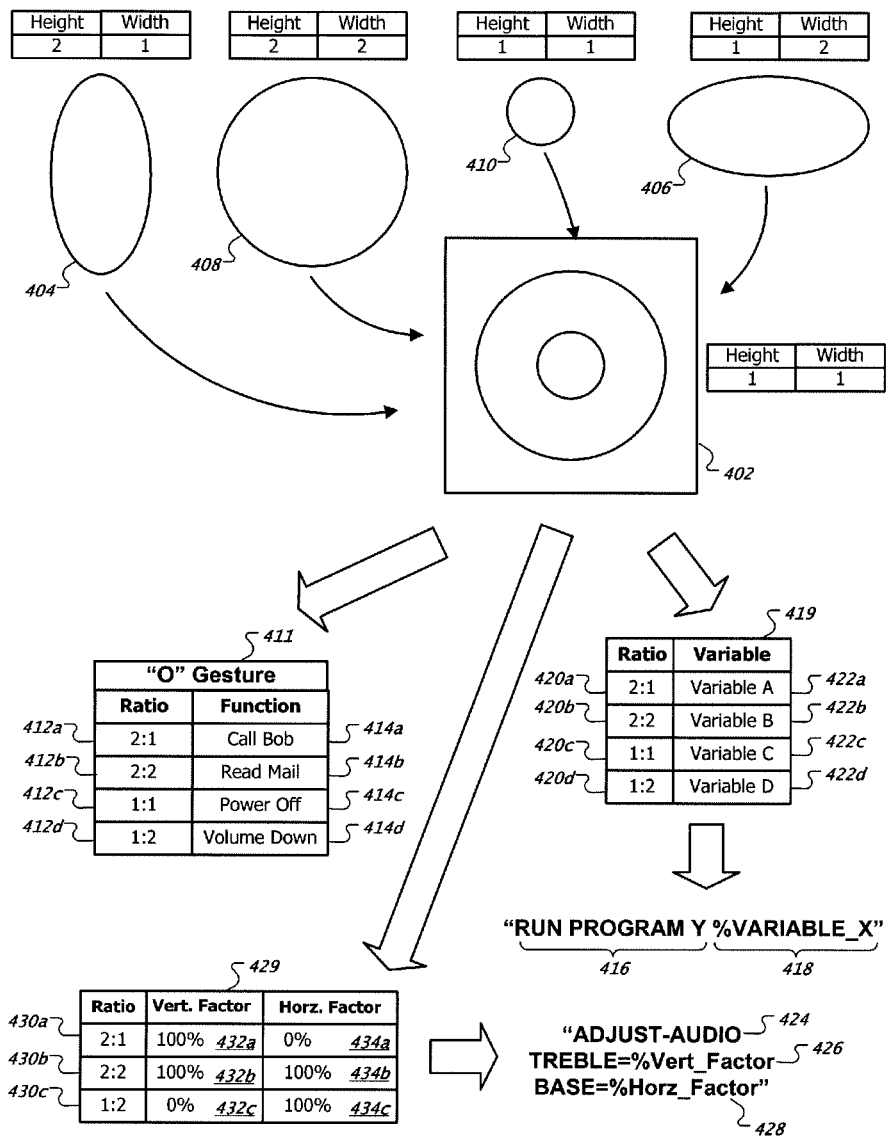
FIG. 4 illustrates gesture normalization.

FIG. 4 illustrates gesture normalization. A gesture definition may include a height-to-width ratio that may be used for shape normalization. For example, for a gesture shaped like an "O" character, a 1 to 1 (i.e., 1:1) height-to-width ratio may be stored to define a normal "O" shape that is a perfect circle, or another ratio, such as 1.2:1, may be stored to define a normal "O" shape that is slightly taller than it is wide. When a gesture is recognized, the height and width of the detected gesture may be determined, and a height-to-width ratio of the detected gesture may be calculated and compared to the height-to-width ratio stored in the gesture definition. If the calculated ratio is different from the ratio stored in the gesture definition, the detected gesture may be scaled or normalized to the ratio stored in the gesture definition.

For example, an "O" shape 402 defines the acceptable boundaries for an "O" shaped gesture. The "O" shape 402 has a normalized height-to-width ratio of 1:1. A user may perform an "O" shaped gesture which is not in a 1:1 ratio, such as a "tall, skinny O" shape 404 which has a 2:1 height-to-width ratio, a "short, fat O" shape 406 which has a 1:2 height-to-width ratio, or a "large O" shape 408 which has a 2:2 height-to-width ratio. A user may perform an "O" shaped gesture which does have a 1:1 ratio, such as a small "O" shape 410. Regardless of the shape, if an "O" shaped gesture such as one of the shapes 404-410 is recognized, a detected height-to-width ratio may be compared to the height-to-width ratio of the normalized shape 402, and the detected gesture may be scaled if the compared ratios are different.

The amount of scaling used to normalize a gesture may be used to determine a function to be invoked. For example, as illustrated by table 411, if a gesture is recognized which has a 2:1 ratio 412a (e.g., as compared to a normal gesture), a "call Bob" function 414a may be invoked. A 2:1 ratio compared to a 1:1 ratio may result in 50% vertical scaling and 0% horizontal scaling. As another example, recognition of the performance of a gesture having a 2:2 ratio 412b may result in the invocation of a "read mail" function 414b. The 2:2 ratio 412b represents a motion with dimensions of 2 distance units high by 2 distance units wide, which, when scaled with 50% vertical scaling and 50% horizontal scaling, would result in a movement or gesture with a 1:1 ratio (i.e. 1 distance unit high by 1 distance unit wide).

Continuing the example, recognition of the performance of a gesture having a 1:1 ratio 412c (i.e., no scaling) may result in the invocation of a "power off" function 414c. As a final example, recognition of the performance of a gesture having a 1:2 ratio 412d (resulting in 50% horizontal scaling and 0% vertical scaling) may result in the invocation of a "volume down" function 414d.

A scaling amount or ratio may also be used as an input parameter to a function to be invoked. For example, a device may be configured such that if an "O" gesture is recognized, a particular function, such as "RUN PROGRAM Y" 416 may be invoked. A function, (e.g. the "RUN PROGRAM Y" function 416) may accept one or more parameters which may be used as inputs by the function. In this example, one parameter 418 named "VARIABLE_X" is used as an input to the function 416.

The value of the parameter 418 may be determined by a detected ratio of a recognized gesture. For example, as illustrated by table 419, if a gesture with a 2:1 ratio 420a is recognized, the parameter 418 may take on a "VARIABLE A" 422a value. As another example, if a gesture with a 2:2 ratio 420b is recognized, the parameter 418 may take on a "VARIABLE B" 422b value. Continuing the example, if a gesture with a 1:1 ratio 420c is recognized, the parameter 418 may take on a "VARIABLE C" 422c value. As a final example, if a gesture with a 1:2 ratio 420d is recognized, the parameter 418 may take on a "VARIABLE D" 422d value. In summary, a gesture may be configured such that a particular function is performed in response to the performance of the gesture, while parameter values (e.g., input values) provided to the invoked function may be determined by a detected height-to-width ratio of the performed gesture.

More than one parameter value may be determined based on characteristics of an inputted gesture. For example, a gesture may be configured such that an ADJUST-AUDIO function 424 is invoked in response to the performance of the gesture. The ADJUST-AUDIO function 424 may accept a parameter 426, which may be used to affect the adjustment of a treble audio setting, and a parameter 428, which may be used to affect the adjustment of a base audio setting.

The values of the parameters 426 and 428 may be determined by a detected height-to-width ratio of an inputted gesture. For example, as illustrated by table 429, if a gesture with a 2:1 ratio 430a is detected, a value of "100%" 432a may be used as the value of the parameter 426, and a value of "0%" 434a may be used as the value of the parameter 428. Put another way, if the detected input gesture is twice as high as the normal gesture, an interpretation may be that a treble setting may be increased by 100% (i.e., doubled), and if the detected input gesture is the same width as the normal gesture, a base setting may remain unaffected (i.e., increased by 0%).

As another example, if a gesture with a 2:2 ratio 430b is detected, a value of "100%" 432b may be used as the value of the parameter 426, and a value of "100%" 434b may be used as value of the parameter 428 (i.e., if an inputted gesture is twice as tall and twice as wide as the normal gesture, both a treble and a base setting should be doubled (increased by 100%)). As a final example, if a gesture with a 1:2 ratio 430c is detected, a value of "0%" 432c may be used as the value of the parameter 426 (indicating no change to a treble setting), and a value of "100%" 434c may be used as the value of the parameter 428 (indicating that a base setting should be doubled).

Figure 5:
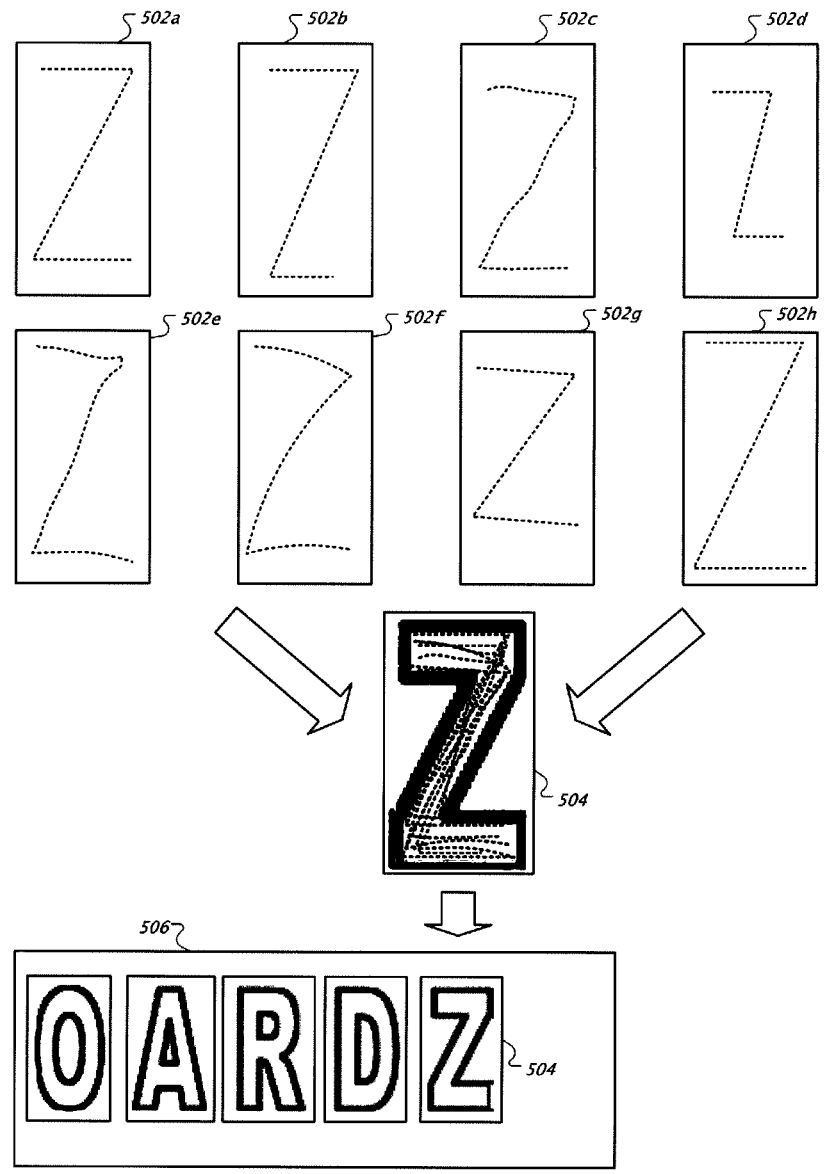
FIG. 5 illustrates gesture training.

FIG. 5 illustrates gesture training. Gesture representations 502a-h represent various training gesture inputs provided by one or more user's repeatedly performing a "Z" shaped gesture. The gesture representations 502a-h are each shown as a set of dots representing a user's movement while performing a respective gesture. The gesture representations 502a-h are overlaid onto each other to form the boundaries of a Z character shape 504 (i.e., once the Z character shape 504 is defined, if a user's movements fall within the boundaries of the Z character shape 504, then a Z character gesture may be recognized).

A device may include a pre-existing vocabulary 506 which includes a set of defined gestures. The Z character shape 504 may be inserted into the pre-existing vocabulary 506 so that subsequent Z-shaped gestures performed by a user may be recognized. Gestures may be defined by a manufacturer and/or by a user. A manufacturer may use one or more test users to train a device, resulting in the formation of recognizable boundaries of characters or other shapes that are included in a pre-defined vocabulary of a device. A user may add custom gestures to a vocabulary of a device, training the device to recognize user-specific movements used when performing a gesture.

Figure 6:
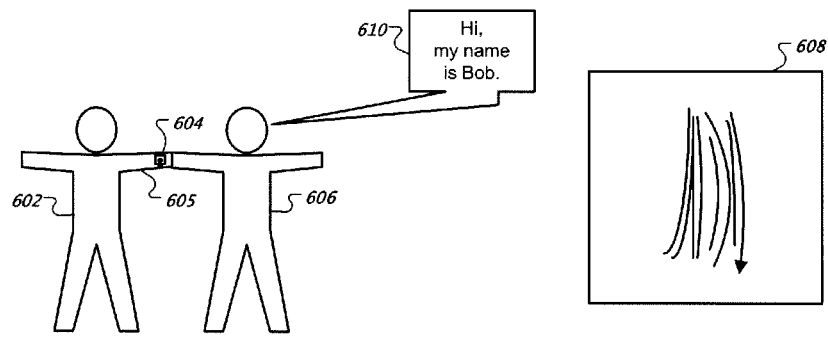
FIG. 6 illustrates subconscious gestures.
Figure 6:
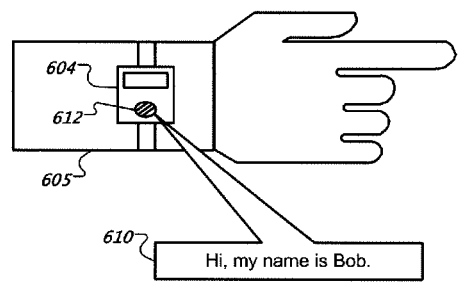

FIG. 6 illustrates subconscious gestures. For example, a user 602 wearing a wrist-watch device 604 shakes the hand of a person "Bob" 606. The wrist-watch device 604 recognizes a handshake gesture 608, defined as a set of up-and-down movements spaced tightly together. In response to the recognition of the handshake gesture 608, the wrist-watch device 604 initiates a sound recorder to record audio for a brief period (e.g., two seconds) after detection of the handshake gesture 608. For example, the wrist-watch device 604 may record the sound snippet "Hi, my name is Bob" 610 spoken by the person Bob 606. At a later time, the user 602 may play back the recorded audio, such as through a speaker 612 on the wrist-watch device 604.

A table 614 illustrates other example subconscious gestures and concomitant device functionality invoked in response to the recognition of the performance of a subconscious gesture. For example, in response to the recognition of a choking gesture, a 911 emergency phone call may be placed (e.g., by a mobile phone device). As another example, if a nervous jitter of a user is recognized, soothing music may be played, or the user may be prompted to play an entertaining video game. As yet another example, if a mobile phone device detects a "move phone to ear" gesture, a timer may be initiated. Devices may be wrist-watch devices, mobile phones or other portable devices, or may be incorporated into a wearable item.

Figure 7:
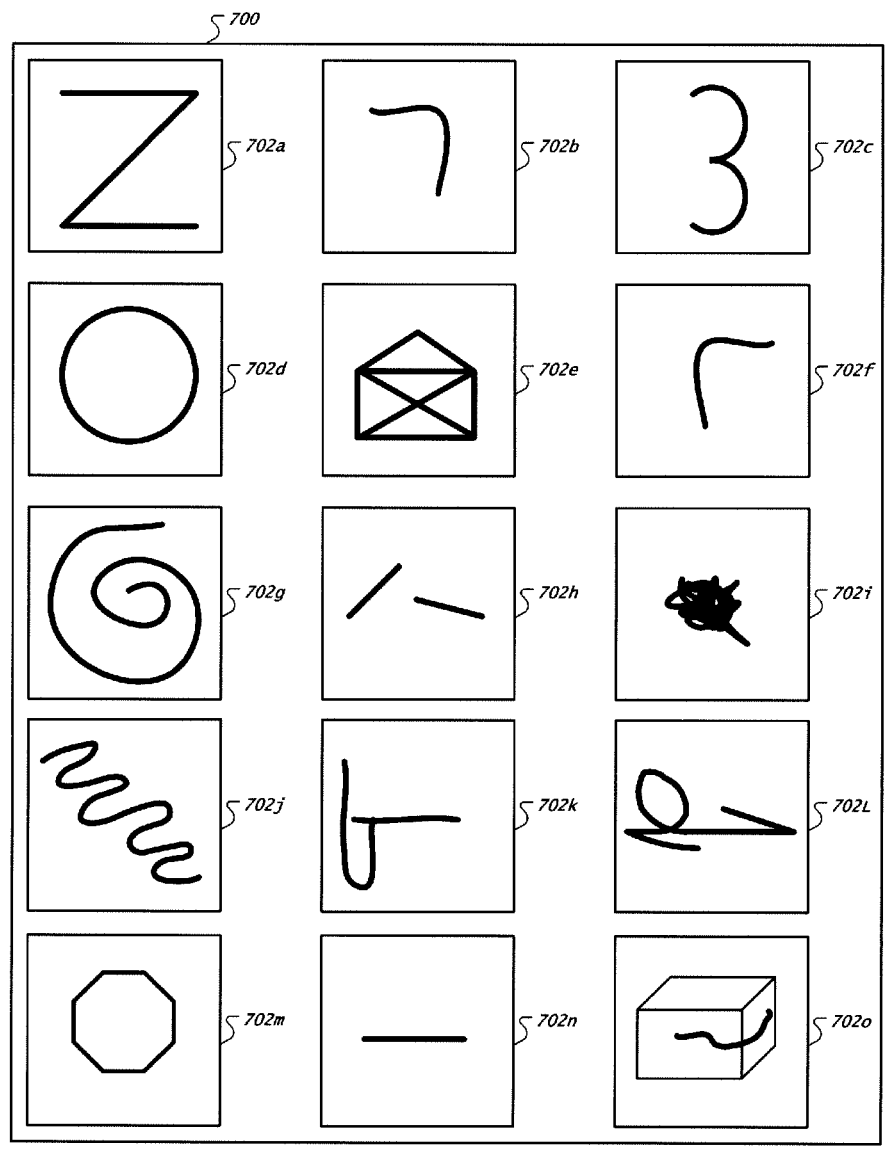
FIG. 7 illustrates an example gesture vocabulary.

FIG. 7 illustrates an example gesture vocabulary 700. For example, the vocabulary 700 may include example gesture representations 702a-o. Gestures may be alphabetic (e.g., 702a, 702d) or numeric (e.g., 702c) or be other types of symbols. For example, gestures may include wavy or spiral lines (e.g., 702g, 702j). Gestures may be symbols which represent real world items (e.g., the representation 702e represents an envelope and the representation 702m represents an octagon, or stop sign).

Other examples illustrate that a gesture may be generally linear (e.g., 702n) or may be polygonal (e.g., 702d, 702m). Gestures may be formed through connected movements, or the gestures may include disconnected motions or trajectories (e.g., 702h). A gesture may be formed through continuous movement, or may involve discontinuous movement (e.g., 702k, or a gesture (not shown) representing the letter "T"). Gestures may include intersecting lines (e.g., 702e, 702L). Other example gestures are possible, such as three-dimensional gestures (e.g., 702o) and a gesture made up of the tight movements formed from a handshake (e.g., 702i).

Gestures may represent characters used in hand-writing recognition technologies, such as Unistrokes, Quikwriting and Graffiti. Hand-writing recognition technologies may include character definitions which allow a user to write characters without lifting a pen. For example, the representation 702b represents the character "T" in Graffiti, and the representation 702f represents the character "F" in Unistrokes. Gestures may also represent words. For example, the representation 702L may represent the word "the" in Quikwriting.

Figure 8:
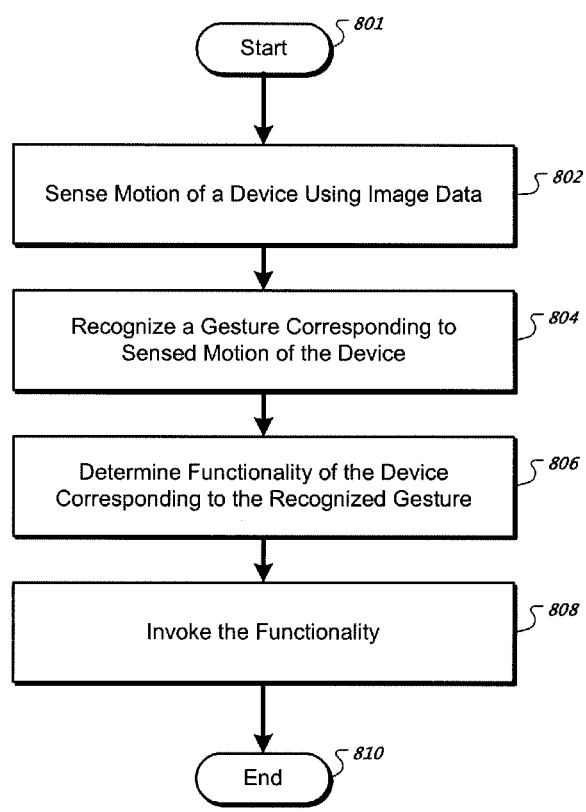
FIG. 8 is a flowchart of an exemplary process.

FIG. 8 is a flowchart illustrating a computer-implemented process 800 that effects functionality invocation in response to recognized gestures. Briefly, the computer-implemented process 800 includes sensing motion of a device using image data, recognizing a gesture corresponding to the sensed motion of the device, determining functionality of the device corresponding to the recognize gesture, and invoking the determined functionality.

In further detail, when the process 800 begins (S801), motion of a device is sensed using image data (S802). For example, a sensor may detect motion of the device. The sensor may be any type of component or apparatus configured to detect or sense motion or position of the device. For instance, the sensor may be one or more built-in cameras, one or more gyroscopes, or one or more global positioning system (GPS) trackers. The device may be equipped with any of these devices or a combination of these devices.

A processor may detect motion of the device based on input from the sensor. For example, in implementations in which the device includes a camera, the processor may detect motion of the mobile device by analyzing a sequence or series of images captured by the camera. In this example, the processor may detect motion of the device by performing an optical flow process on images captured by the camera. In implementations in which the device includes a gyroscope, the processor may detect motion of the device by analyzing data provided by the gyroscope. In these implementations, the trajectory of movement may be detected by the processor through the motion vectors produced by the gyroscope. In implementations in which the device includes a GPS tracker or receiver, the processor may detect motion of the device by analyzing data provided by the GPS tracker or receiver. In these implementations, the processor may determine motion vectors by recording and analyzing relative positions of the device throughout a movement.

In some implementations, the device may be equipped with position detection/tracking equipment such as wireless position tracking tools either onset or offset. Any device or apparatus that reveals a unique trajectory according to a unique movement of the device may be used in detecting motion of the device. For example, the motion detected by the processor may be a detected trajectory or pattern of motion of the device.

In response to detecting motion of the device, a gesture corresponding to sensed motion of the device is recognized (S804). A processor may access a vocabulary of gestures. For example, the processor may access data defining a vocabulary of gestures from electronic storage associated with the device. A set of trajectories may be defined as a vocabulary. These gestures may be performed by moving the device in the air to draw the intended trajectory. The intended trajectory or pattern of motion may be detected by the processor as discussed above. The vocabulary of gestures may include data defining motion of the device that corresponds to gestures recognized by the device.

The processor may determine a gesture based on the detected motion of the device and accessed motion data. For example, a number of processes may be used to process input received from the media or sensor to recognize hand gestures, particularly for recognizing hand drawn trajectories. In some implementations, point-matching routines, hidden Markov models, and other pattern recognition processes may be employed to recognize the gestures defined in the vocabulary of gestures.

In determining a gesture, the processor also may reject gestures not defined in the vocabulary. Rejecting gestures may be important because the processor may distinguish motions not intended to be user input commands from motions intended to be user input commands. Rejecting gestures may be based on hidden Markov models (HMMs). For example, an HMM-based rejection method for recognizing hand gestures may be used to reject arbitrary movements.

In some implementations, the processor may compare the detected motion of the device to the motion data included in the vocabulary of gestures. If the processor finds a match, the processor determines that the motion of the device corresponds to the gesture associated with the matched motion data. If the processor does not find a match, the processor continues to compare the detected motion of the device to the motion data associated with other gestures in the vocabulary of gestures until a match is found or the processor determines that the detected motion does not match any of the gestures. The processor may process the detected motion data prior to comparing the detected motion data to the motion data included in the vocabulary of gestures.

Alternatively, the unknown gesture may be compared to all of the models in the vocabulary and a single candidate gesture that is a most likely match may be selected. This rejection approach has been developed to avoid mismatching that could be caused by finding the maximum likelihood only.

Generally, a gesture is intended to refer to a movement, position, pose, or posture that expresses an idea, opinion, emotion, communication, command, demonstration or expression. A user may gesture while holding a hand-held device, or the user may gesture using one or more body parts while wearing a device on a part of their body. For instance, the user's gesture may be a single or multiple finger gesture; a single hand gesture; a single hand and arm gesture; a single hand and arm, and body gesture; a bimanual gesture; a head pose or posture; an eye position; a facial expression; a body pose or posture, or any other expressive body state.

A user's gesture may be expressive of an enabling or "engagement" gesture. The engagement gesture may be a specific hand pose or hand motion sequence gesticulated that is held for a predetermined amount of time. One example engagement gesture is the user holding a hand-held device immobile for three seconds. Another example is a circular hand motion made while holding a hand-held device by the user extending their arm in front of their face, and moving their arm in a circle in front of their head. As another example, an engagement gesture may be a user shaking a device. In essence, an engagement gesture specifies to a device the user is ready for further input to occur. To reduce errors, an engagement gesture may be an atypical gesture, such as a gesture that would not subconsciously be made with body language during a normal conversation, or a gesture that would not be made in the ordinary performance of normal human activity.

A gesture may be derived that defines an idea, opinion, emotion, communication, command, demonstration or expression of the user. For instance, the user's gesture may be a single or multiple finger gesture; a single hand gesture; a single hand and arm gesture; a single hand and arm, and body gesture; a bimanual gesture; a change in head pose or posture; a change in an eye position; a change in a facial expression; a movement of a hand while holding a device; a change in a body pose or posture, or a transformation of any other expressive body state.

For brevity, the body part or parts used to perform relevant gestures are generally referred to as a "control object." For instance, the user may express a command using their entire body or with other physical objects, in which case their entire body or the other physical objects may be the control object. A user may more subtly express a command by blinking their eye, by flaring their nostrils, or by wiggling a finger, in which case the eyelid, nose, or finger may be the control object. A control object may also be a physical device, such as an infrared finger light, a mobile device, a wrist-watch device, a retro-reflector, or a remote control, to name a few examples.

There are many ways of determining a user's gesture from motion data. For instance, the gesture of "drawing a circle in the air" or "swiping the hand off to one side" may be detected by a gesture analysis and detection process using the hand, arm, body, head or other object position information. Although the gesture may involve a two- or three-dimensional position displacement, such as when a swiping gesture is made, in other instances the gesture includes a transformation without a concomitant position displacement. For instance, if a hand is signaling "stop" with five outstretched fingers and palm forward, the gesture of the user changes if all five fingers are retracted into a ball with the palm remaining forward, even if the overall position of the hand or arm remains static.

Gestures may be detected using heuristic techniques, such as by determining whether hand or device position information passes explicit sets of rules. For example, the gesture of "swiping the hand off to one side" may be identified if the following gesture detection rules are satisfied: (1) the change in horizontal position is greater than a predefined distance over a time span that is less than a predefined limit; (2) the horizontal position changes monotonically over that time span; (3) the change in vertical position is less than a predefined distance over that time span; and (4) the position at the end of the time span is nearer to (or on) a border of the hand detection region than the position at the start of the time span.

Some gestures utilize multiple rule sets that are executed and satisfied in an explicit order, where the satisfaction of a rule set causes a system to change to a state where a different rule set is applied. This system may be unable to detect subtle gestures, in which case Hidden Markov Models may be used, as these models allow for chains of specific motions to be detected, but also consider the overall probability that the motions sufficiently fit a gesture.

So as to enable the input of complex commands and to increase the number of input options, the process for recognizing the user's gesture may further include recognizing a first displacement in a first direction, and recognizing a second displacement in a second direction, and aggregating these multiple displacements as a single gesture. Furthermore, the recognition of the user's gesture may determine a magnitude and direction of the user's gesture.

In response to recognizing a gesture, functionality of the device corresponding to the recognized gesture is determined (S806). For example, a processor may access function data associated with the recognized gesture. For example, the processor may access function data associated with the determined gesture from electronic storage associated with the device. In this example, the function data associated with the determined gesture may be stored in the vocabulary of gestures. For instance, the vocabulary of gestures may include data correlating or associating a recognized gesture with a particular function or user input command. The vocabulary of gestures may be defined such that each gesture is assigned to a function in the device. For example, a gesture that draws a Z in the air may be assigned to an "Open Voice Mailbox" function of a mobile phone device; a gesture that draws a circle may be assigned to a "Redial" function; a gesture that draws half a circle may be assigned to a "Rotate" function that rotates an image or icon displayed on the display of the device, etc.

After functionality has been determined, the functionality is invoked (S808), thereby ending the process 800 (S810). For example, a processor may execute instructions that perform the determined functionality. The function performed by the device may open a voicemail inbox, dial a particular phone number, rotate an image displayed on a display associated with the device, move an icon or object displayed on a display associated with the device, etc.

Figure 9:
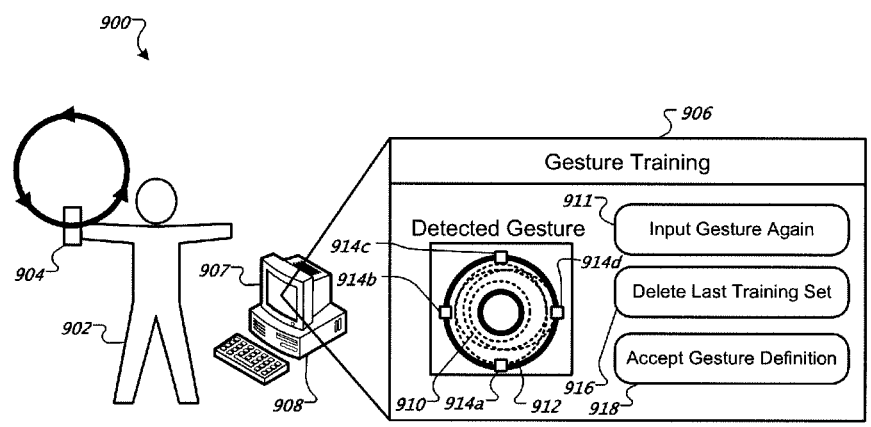
FIG. 9 illustrates an environment for gesture training.

FIG. 9 illustrates an environment 900 for gesture training. A user 902 performs a training gesture, in this example moving a device 904 in a circular motion. The user 902 may be an end user (i.e., consumer) of the device 904, customizing the device 904 for their own use, or the user 902 may be a test user, training the device 904 as part of a manufacturer's design and/or development of the device 904. A manufacturer may use multiple test users to train the device 904.

A user interface 906 shown on a display 907 of a computing device 908 displays a representation of the performed gesture, along with representations 910 (shown here as series of dots) of previously performed gestures. The user 902 may select a button 911 to input another training gesture. The user 902 may input as many training gestures as desired. As the user 902 repeatedly performs training gestures, the computing device 908 places a boundary 912 around the representations 910 of the inputted gestures. The boundary 912 defines an area of movement which, once defined, may be compared to subsequent user movements to recognize a defined gesture. The user 902 may move (e.g., select and drag) one or more sizing handles 914a-d to refine (e.g., change the size, position, orientation of) the boundary 912.

The user 902 may select a button 916 to delete information associated with the most recently inputted training gesture. The user 902 may select a button 918 to accept the gesture definition modeled by the accepted inputs. Other user interface elements may be shown, such as a button (not shown) used to cancel the creation of the current gesture definition.

The user interface 906 may be used to model multiple gestures. The user interface 906 may be used to define new gesture definitions, and/or may be used to adjust or refine existing or pre-defined gesture definitions. For example, a consumer user may use the user interface 906 to enlarge the boundaries of a pre-defined gesture.

The computing device 908 may be a desktop personal computer, a laptop computer, a mobile phone, personal digital assistant (PDA), gaming device, or other device which includes a display. The device 904 may communicate with the computing device 908 over one or more wired or wireless networks and/or connections. In some implementations, the device 904 and the computing device 908 are the same device (i.e., the user performs a training gesture using the device 904 and then interacts with the user interface 906 which is displayed on the device 904).

Figure 10:
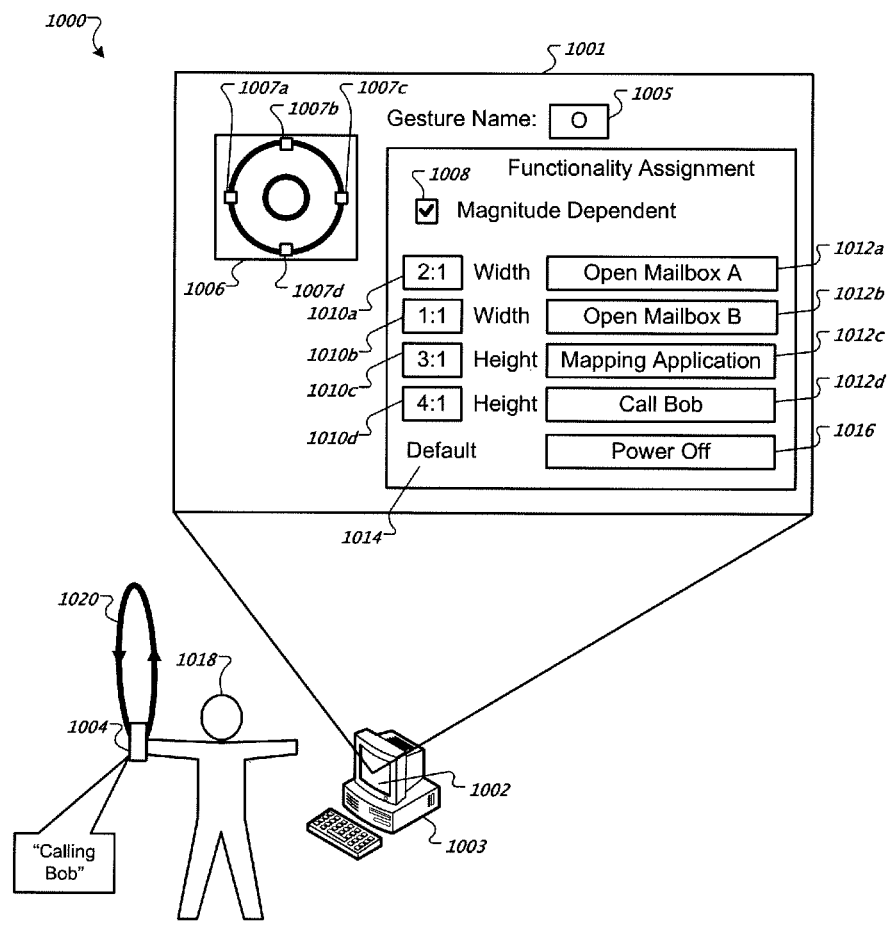
FIG. 10 illustrates an environment for gesture configuration.

FIG. 10 illustrates an environment 1000 for gesture configuration. The environment 1000 includes a user interface 1001. The user interface 1001 may be displayed, for example, after a gesture has been trained. The user interface 1001 may be launched by an end user (e.g., consumer), or by a test user working on behalf of a manufacturer or an application developer.

The user interface 1001 may be shown on a display 1002 of a computing device 1003. The computing device 1003 may be a desktop personal computer, a laptop computer, a mobile phone, personal digital assistant (PDA), gaming device, or other device which includes a display. The computing device 1003 may communicate with a mobile device 1004 over one or more wired or wireless networks and/or connections. In some implementations, the mobile device 1004 and the computing device 1003 are the same device.

A gesture name 1005 may be entered and/or edited using the user interface 1001. The user may adjust a boundary 1006 of the gesture by dragging and moving one or more sizing handles 1007a-d. Functionality may be assigned to a gesture using the user interface 1001. A check box 1008 may be used to indicate that assigned functionality may be magnitude dependent.

For example, a gesture may be configured such that if a gesture with a 2:1 width ratio 1010a is performed (i.e., a performed gesture's width is 2 times that of a defined normal gesture's width), an "open mailbox A" function 1012a may be invoked. Additionally, the following exemplary configurations may be made: 1) if a gesture with a 1:1 width ratio 1010b is performed, an "open mailbox B" function 1012b may be invoked; 2) if a gesture with a 3:1 height ratio 1010c is performed, a "mapping application" function 1012c may be invoked; and 3) if a gesture with a 4:1 height ratio 1010d is performed, a "call Bob" function 1012d may be invoked. A default case 1014 may be defined, so that if a gesture with a 1:1 width-to-height ratio compared to a defined normal gesture is performed, a default "power off" function 1016 may be invoked.

As an example of gesture configuration, if a user 1018 performs a "tall, skinny" oval-shaped gesture 1020 using the mobile device 1004, the mobile device 1004 may recognize the gesture 1020 and may determine a height ratio of 4:1 by comparing the height of the recognized gesture 1020 to the height of a defined normal gesture. The mobile device 1004 may also determine that the function 1012d ("call Bob") has been assigned to the 4:1 height ratio 1010d, and in response to recognizing the gesture 1020, the "call Bob" function 1012d may be invoked.

Other gesture configurations may be made. For example, functionality assignment may be dependent on factors other than gesture height and width. For instance, functionality assignment may be dependent on gesture speed (e.g., a first function may be configured to be invoked in response to a slowly-performed gesture, and a second function may be configured to be invoked in response to a faster performance of that gesture).

Figure 11:
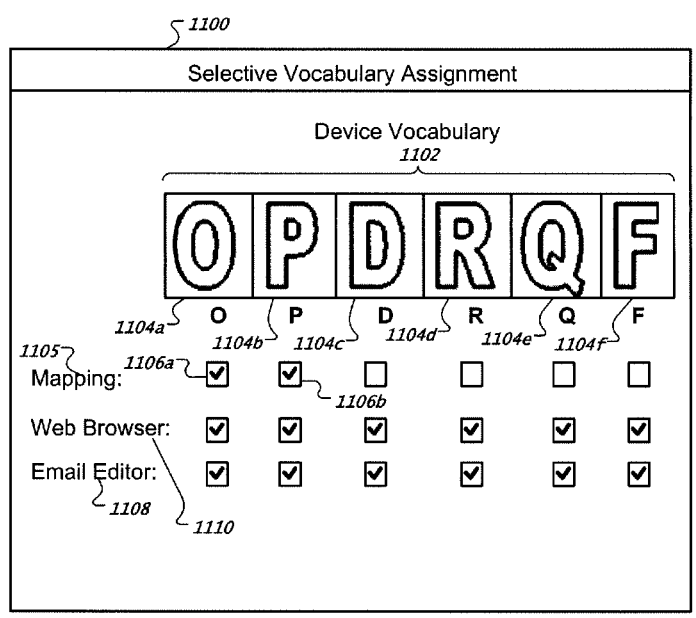
FIG. 11 illustrates a user interface for selective gesture activation.

FIG. 11 illustrates a user interface 1100 for selective gesture activation. The user interface 1100 may be used to selectively activate or deactivate gestures that are included in a device vocabulary. For example, a device vocabulary 1102 includes gestures 1104a-f, representing the characters "O", "P", "D", "R", "Q", and "F", respectively. The gestures 1104a-f may be selectively enabled or activated on a per application basis. For example, the gestures 1104a and 1104b are enabled for a mapping application 1105 (as indicated by checkmarks 1106a and 1106b), while gestures 1104c, 1104d, 1104e, and 1104f are disabled (i.e., deactivated) for the mapping application 1105.

For some applications, such as for the mapping application 1105, one gesture in a set of similarly shaped gestures may be enabled while the other gestures in the set are disabled, to avoid confusion when interpreting and recognizing gestures. For example, the gestures 1104c and 1104e ("D" and "Q" shapes, respectively) may be disabled due to their similarity in shape to the "O" shape of the gesture 1104a. Similarly, the gestures 1104d and 1104f ("R" and "F" shapes, respectively) may be disabled due to their similarity to the "P" shape of the gesture 104b. As another example, all of the gestures 1104a-f are enabled for an email editor application 1108 and for a web browser application 1110, since for these applications 1108 and 1110, the user may need to enter text (e.g., email message body, web site address), and thus having every character gesture enabled may be desirable. The activation and deactivation of gestures can also be based on manufacturers settings, or based on past confusion between characters.

Figure 12:
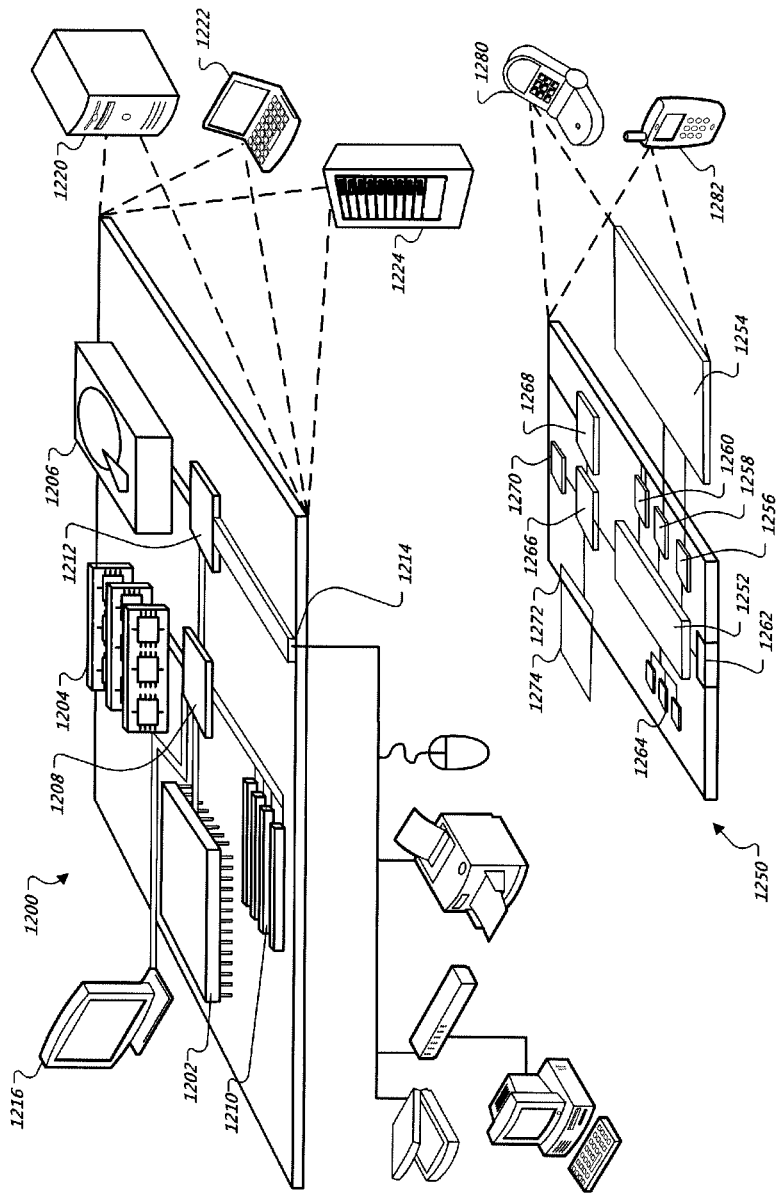
FIG. 12 illustrates exemplary computing devices.

FIG. 12 is a block diagram of computing devices 1200, 1250 that may be used to implement the systems and methods described in this document, as either a client or as a server or plurality of servers. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 may process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a computer-readable medium. In one implementation, the memory 1204 is a volatile memory unit or units. In another implementation, the memory 1204 is a non-volatile memory unit or units.

The storage device 1206 is capable of providing mass storage for the computing device 1200. In one implementation, the storage device 1206 is a computer-readable medium. In various different implementations, the storage device 1206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1204, the storage device 1206, memory on processor 1202, or a propagated signal.

The high speed controller 1208 manages bandwidth-intensive operations for the computing device 1200, while the low speed controller 1212 manages lower bandwidth-intensive operations. Such allocation of duties is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other. The computing device 1200 may include one or more sensors (not shown), such as gyroscopes, cameras or GPS (Global Positioning Satellite) trackers, configured to detect or sense motion or position of the computing device 1200.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate. The computing device 1250 may include one or more sensors (not shown), such as gyroscopes, cameras or GPS (Global Positioning Satellite) trackers, configured to detect or sense motion or position of the computing device 1200.

The processor 1252 may process instructions for execution within the computing device 1250, including instructions stored in the memory 1264. The processor may also include separate analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD display or an OLED display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication (e.g., via a docking procedure) or for wireless communication (e.g., via Bluetooth or other such technologies).

The memory 1264 stores information within the computing device 1250. In one implementation, the memory 1264 is a computer-readable medium. In one implementation, the memory 1264 is a volatile memory unit or units. In another implementation, the memory 1264 is a non-volatile memory unit or units. Expansion memory 1274 may also be provided and connected to device 1250 through expansion interface 1272, which may include, for example, a SIMM card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, memory on processor 1252, or a propagated signal.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS receiver module 1270 may provide additional wireless data to device 1250, which may be used as appropriate by applications running on device 1250.

Device 1250 may also communication audibly using audio codec 1260, which may receive spoken information from a user and convert it to usable digital information. Audio codex 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the systems and techniques described here), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   sensing motion of a device;
   determining a normalized motion by normalizing a shape of the sensed motion of the device, wherein the normalizing comprises scaling the sensed motion in a plurality of spatial dimensions;
   recognizing a gesture corresponding to the normalized motion of the device;
   determining functionality of the device based on the recognized gesture and a ratio of a size of the shape of the sensed motion in a first of the plurality of spatial dimensions to a size of the shape of the sensed motion in a second of the plurality of spatial dimensions; and
   invoking the determined functionality.

2. The method of claim 1, wherein the motion comprises:
   a first motion in a first trajectory; and
   a second motion in a second, different trajectory.

3. The method of claim 1, wherein recognizing the gesture further comprises:
   recognizing a character shape, geometric shape or pattern defined by the sensed motion of the device.

4. The method of claim 1, wherein:
   sensing the motion of the device further comprises detecting a subconscious body movement of a user of the device; and
   the invoked functionality is associated with the subconscious body movement.

5. The method of claim 1, further comprising:
   detecting first and second user inputs at first and second times, respectively,
   wherein sensing the motion of the device further comprises sensing motion of the device occurring between the first and second times.

6. The method of claim 5, wherein the first input is a shaking user input, a control selection user input, or a held-static user input.

7. The method of claim 1, wherein recognizing the gesture further comprises:
   selecting the gesture based on comparing the sensed motion to a modeled vocabulary of gestures.

8. The method of claim 7, wherein the vocabulary of gestures are modeled using a Hidden Markov Model (HMM) or using a rule-based model.

9. The method of claim 7, further comprising:
   selectively activating fewer than all available gestures in the vocabulary of gestures,
   wherein the gesture is selected based on comparing the sensed motion to the activated gestures.

10. The method of claim 9, wherein the fewer than all of the available gestures are enabled based on a manufacturer setting, a user setting or an application setting.

11. The method of claim 7, further comprising:
training the device to recognize a particular gesture; and
adding the particular gesture to the vocabulary of gestures.

12. The method of claim 1, wherein invoking the functionality further comprises executing an application, manipulating an image, or inputting a character.

13. The method of claim 1, wherein sensing motion of the device further comprises:
detecting first and second user inputs and at first and second times, respectively, the first time occurring before the second time;
sensing a first motion in a first trajectory before the first time;
sensing a second motion in a second, different trajectory after the second time;
joining the first and second motions; and
outputting the joined first and second motions as the sensed motion.

14. The method of claim 1, wherein invoking the functionality further comprises navigating in a virtual environment, manipulating an image, entering a character, executing an application, or invoking media hub functionality.

15. The method of claim 1, wherein motion of the device is sensed using image data.

16. The method of claim 1, wherein the normalizing includes adjusting a magnitude of the sensed motion along at least one dimension of the plurality of spatial dimensions.

17. The method of claim 1, wherein the sensed motion is scaled by 0% in at least one of the plurality of spatial dimensions.

18. The method of claim 1, wherein the determining the functionality is dependent on a speed at which the gesture was performed.

19. A device comprising:
a sensor configured to sense motion; and
a processor configured to:
determine a normalized motion by normalizing a shape of the motion sensed by the sensor, wherein the normalizing comprises scaling the sensed motion in a plurality of spatial dimensions;
recognize a gesture corresponding to the normalized motion sensed by the sensor;
determine functionality of the device based on the recognized gesture and a ratio of a size of the shape of the motion sensed by the sensor in a first of the plurality of spatial dimensions to a size of the shape of the motion sensed by the sensor in a second of the plurality of spatial dimensions; and
invoke the determined functionality.

20. The device of claim 19, wherein:
the sensor is a camera; and
the motion is sensed using optical flow.

21. A non-transitory computer-readable medium tangibly encoded with a computer program comprising instructions that, when executed, operate to cause a computer to perform operations comprising:
sensing motion of a device;
determining a normalized motion by normalizing a shape of the sensed motion of the device, wherein the normalizing comprises scaling the sensed motion in a plurality of spatial dimensions;
recognizing a gesture corresponding to the normalized motion of the device;
determining functionality of the device based on the recognized gesture and a ratio of a size of the shape of the sensed motion in a first of the plurality of spatial dimensions to a size of the shape of the sensed motion in a second of the plurality of spatial dimensions; and
invoking the determined functionality.

22. An apparatus comprising:
means for sensing motion of a device;
means for determining a normalized motion by normalizing a shape of the sensed motion of the device, wherein the normalizing comprises scaling the sensed motion in a plurality of spatial dimensions;
means for recognizing a gesture corresponding to the normalized motion of the device;
means for determining functionality of the device based on the recognized gesture and a ratio of a size of the shape of the sensed motion in a first of the plurality of spatial dimensions to a size of the shape of the sensed motion in a second of the plurality of spatial dimensions; and
means for invoking the determined functionality.

* * * * *